US008846250B2

(12) United States Patent
Goh et al.

(10) Patent No.: US 8,846,250 B2
(45) Date of Patent: Sep. 30, 2014

(54) SYSTEM OF LITHIUM ION BATTERY CONTAINING MATERIAL WITH HIGH IRREVERSIBLE CAPACITY

(75) Inventors: Eun Young Goh, Goyang-si (KR); Seung Tae Hong, Daejeon (KR)

(73) Assignee: LG Chem, Ltd. (KR)

( * ) Notice: Subject to any disclaimer, the term of this patent is extended or adjusted under 35 U.S.C. 154(b) by 2331 days.

(21) Appl. No.: 11/409,575

(22) Filed: Apr. 24, 2006

(65) Prior Publication Data
US 2006/0257737 A1 Nov. 16, 2006

(30) Foreign Application Priority Data
Apr. 22, 2005 (KR) .................. 10-2005-0033466

(51) Int. Cl.
| | |
|---|---|
| H01M 4/485 | (2010.01) |
| H01M 4/505 | (2010.01) |
| H01M 4/525 | (2010.01) |
| H01M 10/0525 | (2010.01) |
| H01M 4/131 | (2010.01) |
| H01M 2/16 | (2006.01) |
| H01M 4/02 | (2006.01) |

(52) U.S. Cl.
CPC .......... *H01M 10/0525* (2013.01); *H01M 4/505* (2013.01); *H01M 4/485* (2013.01); *Y02E 60/122* (2013.01); *H01M 2/16* (2013.01); *H01M 4/525* (2013.01); *H01M 2004/028* (2013.01); *H01M 4/131* (2013.01)
USPC ..... 429/231.5; 429/223; 429/224; 429/231.1; 429/231.6

(58) Field of Classification Search
CPC ...... H01M 4/485; H01M 4/505; H01M 4/525
USPC ................ 429/224, 223, 231.1, 231.8, 231.5, 429/231.6
See application file for complete search history.

(56) References Cited

U.S. PATENT DOCUMENTS

| | | | |
|---|---|---|---|
| 5,759,719 A * | 6/1998 | Mao | ............................... 429/223 |
| 6,964,828 B2 | 11/2005 | Lu et al. | |
| 2002/0018935 A1 | 2/2002 | Okada | |
| 2003/0049541 A1 | 3/2003 | Inagaki et al. | |
| 2004/0185346 A1 | 9/2004 | Takeuchi et al. | |

FOREIGN PATENT DOCUMENTS

| | | |
|---|---|---|
| EP | 1391950 | 2/2004 |
| JP | 2002237293 | 8/2002 |
| KR | 1020010018452 | 3/2001 |
| KR | 1020060008568 | 1/2006 |
| WO | 2004091016 | 10/2004 |
| WO | 2005-031892 A2 | 4/2005 |

OTHER PUBLICATIONS

Korean Office Action; Mar. 29, 2007; 016953614.

(Continued)

*Primary Examiner* — Tracy Dove
(74) *Attorney, Agent, or Firm* — Lerner, David, Littenberg, Krumholz & Mentlik, LLP

(57) ABSTRACT

Disclosed is a cathode active material comprising a lithium-free metal oxide and a material with high irreversible capacity. A novel lithium ion battery system using the cathode active material is also disclosed. The battery, comprising a cathode using a mixture of a Li-free metal oxide and a material with high irreversible capacity, and an anode comprising carbon instead of Li metal, shows excellent safety compared to a conventional battery using lithium metal as an anode. Additionally, the novel battery system has a higher charge/discharge capacity compared to a battery using a conventional cathode active material such as lithium cobalt oxide, lithium nickel oxide or lithium manganese oxide.

14 Claims, 3 Drawing Sheets

(56) References Cited

OTHER PUBLICATIONS

International Search Report; PCT/KR20061001485; Aug. 8, 2006.
All references cited in the Search report and Office action, and not previously submitted are listed above.

Chinese Office Action for application no. 200680013563.8 dated Dec. 5, 2008.
European Supplementary Search Report for application no. EP06747395 completed Oct. 15, 2008.

* cited by examiner

SYSTEM OF LITHIUM ION BATTERY CONTAINING MATERIAL WITH HIGH IRREVERSIBLE CAPACITY

This application claims the benefit of the filing date of Korean Patent Application No. 10-2005-0033466, filed on Apr. 22, 2005, in the Korean Intellectual Property Office, the disclosure of which is incorporated herein in its entirely by reference.

TECHNICAL FIELD

The present invention relates to a novel lithium ion battery system comprising a material with high irreversible capacity.

BACKGROUND ART

Generally, in the case of a conventional battery using a lithium (Li)-free metal oxide as a cathode active material, it is necessary to use Li metal as an anode in order to provide a Li source. However, if Li metal reacts with water, hydrogen gas is generated and a rapid exothermic reaction occurs. Moreover, Li metal shows high reactivity to an electrolyte at high temperature. Therefore, in such batteries, safety-related problems occur due to the use of Li metal.

DISCLOSURE OF THE INVENTION

Therefore, the present invention has been made in view of the above-mentioned problems. It is an object of the present invention to provide a novel battery system, which comprises a Li-free metal oxide as a cathode active material, while using carbon as an anode instead of Li metal.

The inventors of the present invention have conducted intensive studies and have found that when a coin-like cell is manufactured by using 40~80 wt % of $Li_2NiO_2$, which is one of the materials represented by the formula of $Li_2MO_2$ (wherein M=Ni, Cu) and having high irreversible capacity, combined with 20~60 wt % of $MnO_2$ and $MoO_3$, which are Li-free metal oxides having a relatively high capacity, and then is subjected to a charge/discharge test, the cell shows excellent discharge capacity. The present invention is based on this finding.

According to an aspect of the present invention, there is provided a cathode active material comprising a lithium-free metal oxide and a lithium-containing material with high irreversible capacity. A lithium ion battery using the same cathode active material is also provided.

Hereinafter, the present invention will be explained in more detail.

In general, a cathode may be formed by applying electrode slurry comprising a cathode active material, a conductive agent and/or a binder onto a current collector. Herein, the cathode active material includes a material capable of lithium ion intercalation/deintercalation when examined from the electrochemical point of view. Cathode active materials that are currently used include lithium cobalt oxide, lithium nickel oxide, lithium manganese oxide, or the like.

The cathode active material according to the present invention is characterized by comprising a lithium-free metal oxide and a lithium-containing material with high irreversible capacity.

The cathode active material according to the present invention may comprise a mixture of the above two materials, or may further comprise a conventional cathode material (for example, $LiCoO_2$, $LiNiO_2$, spinel, $Li(Ni_{1/3}Mn_{1/3}Co_{1/3})O_2$, etc.) in addition to the above two materials. Additionally, the cathode active material according to the present invention may have a core-shell structure, wherein any one material of the above two materials is encapsulated with the other material. Further, the lithium-free metal oxide and/or the lithium-containing material with high irreversible capacity may be surface-coated with another material (such as B, Al, Mg, F, etc.) or may be doped with a different element.

Herein, the material with high irreversible capacity means a material having a high irreversible capacity in the first charge/discharge cycle (i.e., charge capacity in the first cycle—discharge capacity in the first cycle). In other words, the material with high irreversible capacity can provide an excessive amount of lithium ions in an irreversible manner upon the first charge/discharge cycle. For example, the material with high irreversible capacity includes a cathode active material, such as a lithium transition metal compound that is capable of lithium ion intercalation/deintercalation and has high irreversible capacity in the first cycle.

Although currently used cathode active materials have an irreversible capacity corresponding to 2~10% of the initial charge capacity, the material with high irreversible capacity, used in the present invention, has an irreversible capacity corresponding to 10% or more of the initial charge capacity. Different materials have different levels of irreversible capacity. For example, $Li_2NiO_2$ has an irreversible capacity of about 65% based on the initial charge capacity, while $Li_2CuO_2$ has an irreversible capacity of about 95% based on the initial charge capacity.

Preferably, the material with high irreversible capacity, which may be used in the present invention, loses 50% or more of the initial charge capacity by way of an irreversible phase transition (e.g., Immm→R3-m) upon the lithium deintercalation in the first cycle.

Meanwhile, it is preferable to use a material having a higher irreversible capacity, so as to reduce the amount of the material.

For example, $Li_2MO_2$ (wherein M=Cu and/or Ni), used as the material with high irreversible capacity, undergoes a change in the lattice structure from the space group Immm to the space group R3-M while lithium ions are deintercalated during the first charge cycle. When the material has the latter lattice structure (R3-M), it contains lithium ions capable of intercalation/deintercalation in an amount corresponding to a half of the amount of lithium ions capable of intercalation/deintercalation in the material having the space group Immm. Therefore, a great irreversible capacity may be generated upon the first cycle.

Typical examples of the material with high irreversible capacity include a compound represented by the following Formula 1:

$$Li_{2+x}Ni_{1-y}M_yO_{2+\alpha} \quad \text{[Formula 1]}$$

wherein $-0.5 \leq x \leq 0.5$; $0 \leq y \leq 1$; $0 \leq \alpha < 0.3$; M is at least one element selected from the group consisting of P, B, C, Al, Sc, Sr, Ti, V, Zr, Mn, Fe, Co, Cu, Zn, Cr, Mg, Nb, Mo and Cd.

Preferably, the compound represented by formula 1 belongs to the space group Immm. More preferably, the Ni/M composite oxide forms planar tetracoordinate structures (Ni, M)$O_4$, wherein one planar tetracoordinate structure shares a side (side formed by O—O) with the nearest neighbor planar tetracoordinate structure, thereby forming a linear chain. Also, it is preferable that the compound represented by formula 1 has the following crystal lattice dimensions: a=3.7±0.5 Å, b=2.8±0.5 Å, c=9.2±0.5 Å, α=90°, β=90°, and γ=90°.

In the structure represented by the above formula 1, Li ion intercalation/deintercalation occurs during the first charge/ discharge cycle. At this time, the oxidation number of Ni or M is changed from +2 to +4, while the $Li_{2+x}Ni_{1-y}M_yO_{2+\alpha}$ structure undergoes a phase transition into $Li_{2+x-z}Ni_{1-y}M_yO_2$ ($0 \leq z < 2$).

For example, $LiNiO_2$ has a lattice structure corresponding to the space group R3-m (trigonal hexagonal) having the following crystal lattice dimensions: a=b (a equals to b), c is different from a and b, $\alpha=\beta=90°$, and $\gamma=90°$.

The compound represented by formula 1 allows lithium deintercalation in an amount of 1 mole or more upon the first charge cycle, and allows lithium ion intercalation/deintercalation in an amount of 1 mole or less from the first discharge cycle to the subsequent charge/discharge cycles.

For example, contrary to $LiNiO_2$, in the case of $Li_2NiO_2$, it is possible to cause 1 mole or more of lithium ions to be deintercalated toward an anode during the first charge cycle, while causing 1 mole or less of lithium ions to be intercalated into a cathode during the first discharge cycle. Hence, $Li_2NiO_2$ has a discharge efficiency of the first cycle (discharge capacity in the first cycle/charge capacity in the first cycle X 100) of about 40% or less when a battery is discharged to a voltage of 3.0V, and of about 82% when a battery is discharged to a voltage of 1.5V. In the case of the compound represented by formula 1, i.e., $Li_{2+x}Ni_{1-y}M_yO_{2+\alpha}$ also shows irreversibility in the first cycle of lithium ion intercalation/deintercalation, although the discharge efficiency in the first cycle may vary with the content of metal M substituting for Ni.

Other non-limiting examples of the material with high irreversible capacity, which may be used in the present invention, include $LiMnO_2$, $LiM_xMn_{1-x}O_2$ (wherein $0.05 \leq x < 0.5$, and M is selected from the group consisting of Cr, Al, Ni, Mn and Co), $Li_xVO_3$ (wherein $1 \leq x \leq 6$), $Li_3Fe_2(PO_4)_3$, $Li_3Fe_2(SO_4)_3$, $Li_3V(PO_4)_3$, or the like.

Such materials with high irreversible capacity provide an excessive amount of Li ions upon the first charge cycle. After the first charge cycle, a decreased amount of Li ions is intercalated/deintercalated. However, since Li ions are reversibly intercalated/deintercalated during repeated charge/discharge cycles, such materials can serve as cathode active materials.

Non-limiting examples of the lithium-free metal oxide include $MnO_2$, $MoO_3$, $VO_2$, $V_2O_5$, $V_6O_{13}$, $Cr_3O_8$, $CrO_2$, or the like. Such metal oxides have a relatively high electrochemical drive voltage among known metal oxides. It is also possible to use other metal oxides, such as $Al_2O_3$, $ZrO_2$, $AlPO_4$, $SiO_2$, $TiO_2$ or MgO, as the lithium-free metal oxide.

It is preferable that the lithium-free metal oxide has a higher capacity, for example, a capacity of 70 mAh/g~500 mAh/g, even to 500 mAh/g or higher.

Preferably, the cathode active material according to the present invention comprises 40~80 parts by weight of a material with high irreversible capacity and 20~60 parts by weight of a lithium-free metal oxide based on 100 parts by weight of the cathode active material.

The above composition has been determined from the simulation of the capacity of a lithium-free metal oxide and that of a material with high irreversible capacity, as shown in the following Table 1. More particularly, when $Li_2NiO_2$ is used as a material with high irreversible capacity, $Li_2NiO_2$ has a charge capacity of about 400 mAh/g and a discharge capacity of about 330 mAh/g in a voltage range of 1.5V~4.25V. Hence, the cathode active material according to the present invention shows the capacity as shown in Table 1 depending on the content of $Li_2NiO_2$.

TABLE 1

| Discharge capacity of lithium-free metal oxide (mAh/g) | $Li_2NiO_2$ 40 wt % | | $Li_2NiO_2$ 80 wt % | |
|---|---|---|---|---|
| | Charge capacity (mAh/g) | Discharge capacity (mAh/g) | Charge capacity (mAh/g) | Discharge capacity (mAh/g) |
| 70 | 160 | 174 | 320 | 278 |
| 150 | 160 | 222 | 320 | 294 |
| 180 | 160 | 240 | 320 | 300 |
| 300 | 160 | 312 | 320 | 324 |
| 500 | 160 | 432 | 320 | 364 |
| 600 | 160 | 492 | 320 | 384 |

In the above Table 1, when $Li_2NiO_2$ is used in an amount of 80 wt %, it is possible to realize a discharge capacity of 278 mAh/g even in the presence of a lithium-free metal oxide having a low discharge capacity of 70 mAh/g. In this case, it is more preferred to use a lithium-free metal oxide having a higher capacity.

In the above Table 1, when $Li_2NiO_2$ is used in an amount of 40 wt %, there is a low amount of lithium source capable of providing Li in the first cycle. Thus, it is difficult to design a battery with high capacity. However, it is possible to realize a battery with a higher capacity than the capacity of a battery using currently available $LiCoO_2$.

In other words, even if the charge capacity of a lithium-free metal oxide increases, it is not possible to increase the capacity of the whole cathode active material due to the limitation in the amount of Li that can be provided by $Li_2NiO_2$. However, if the discharge capacity is higher than the charge capacity among the simulated cases as shown in Table 1, the net capacity is the same as the charge capacity.

Therefore, according to the present invention, when a Li-free metal oxide combined with a material with high irreversible capacity in an adequately controlled mixing ratio, is used as a cathode active material instead of a conventional Li-containing metal oxide, it is possible to increase the discharge capacity per unit weight of the cathode active material. Particularly, it is possible to obtain a higher discharge capacity than 150 mAh/g, provided by currently used lithium cobalt oxide.

For example, according to the present invention, when a cathode is provided by using a cathode active material comprising 20~60 parts by weight of a lithium-free metal oxide and 40~80 parts by weight of a material with high irreversible capacity based on 100 parts by weight the cathode active material, it is possible to provide a cell having a discharge capacity of 150 mAh/g or higher in the presence of a lithium-free metal oxide having a capacity of about 70 mAh/g~500 mAh/g.

However, $Li_2NiO_2$ may have a slightly different capacity depending on the method by which $Li_2NiO_2$ is prepared. Additionally, when $Li_2NiO_2$ has a higher capacity than the values as described hereinbefore, it is possible to provide a cell having a higher capacity than 150 mAh/g provided by currently used $LiCoO_2$, even though $Li_2NiO_2$ is used in an amount of 40 parts by weight or less and the lithium-free metal oxide has a capacity of 70 mAh/g or less.

Further, when an electrochemical device is provided by using the cathode active material according to the present invention, which comprises a lithium-free metal oxide and a material with high irreversible capacity, it is possible to increase the safety of the electrochemical device, because an anode active material other than lithium metal, such as carbon, can be used in an anode. That is, when lithium metal is used as an anode active material, lithium may react with water with explosive reactivity or react with oxygen with high reactivity. Therefore, when carbon is used as an anode active material instead of lithium metal, it is possible to obtain an increased level of safety.

According to another aspect of the present invention, it is possible to provide a cathode by using, as a cathode active material, a mixture of a lithium-free metal oxide with a material with high irreversible capacity, adding the mixed cathode active material, a conductive agent and a binder to a solvent to form cathode slurry, and by coating the slurry onto a current collector. In one embodiment of the method for forming the cathode slurry, a binder is dissolved into NMP to form a binder solution, and then powder components, including a conductive agent, the material with high irreversible capacity and the Li-free metal oxide, are added to the binder solution so as to be dispersed therein, thereby providing cathode slurry.

Non-limiting examples of the conductive agent include carbon black, and those of the binder include polytetrafluoroethylene (PTFE), polyvinylidene fluoride (PVdF) or a copolymer thereof, cellulose, or the like. Non-limiting examples of the dispersant that may be used in the cathode slurry include isopropyl alcohol, N-methylpyrrolidone (NMP), acetone, or the like.

The current collector includes a metal with high conductivity, and any metals that permit easy adhesion of the paste comprising the above materials can be used as the current collector as long as they are not reactive in the voltage range of a battery in which they are used. Typical examples of the current collector include mesh or foil formed of aluminum, stainless steel, etc.

Typical examples of the electrochemical device according to the present invention include lithium ion batteries. In general, a lithium ion battery comprises:

(1) a cathode capable of lithium ion intercalation/deintercalation;
(2) an anode capable of lithium ion intercalation/deinetercalation;
(3) a porous separator; and
(4) (a) a lithium salt; and
    (b) a solvent for electrolyte.

The electrochemical device according to the present invention comprises a cathode active material formed of a Li-free metal oxide and a material with high irreversible capacity. Thus, it is possible to use a material (preferably carbon), which contains no lithium and is capable of lithium ion intercalation/deintercalation, as an anode active material.

Non-limiting examples of carbon that may be used in the present invention include natural graphite, artificial graphite, and carbonaceous materials other than graphite.

The compound that may be used in the present invention as an anode active material includes a lithium intercalation compound in addition to carbon. The lithium intercalation compound refers to a compound comprising crystal lattice that functions as an electron donor and an external electron acceptor by donating or accepting lithium atoms that are present locally or are scattered widely between planes of crystal lattice. More particularly, the term "intercalation compound" means a compound that allows lithium ions to be intercalated/deintercalated topotactically and reversibly to a certain range of solid solutions.

When a Li-free metal oxide combined with a material with high irreversible capacity is used as a cathode active material of a battery and carbon capable of lithium intercalation/deintercalation is used as an anode active material of the battery, the battery is charged/discharged according to the following mechanism. Upon the first charge cycle, Li ions are deintercalated from the material with high irreversible capacity and then intercalated into carbon of the anode. Upon the first discharge cycle, Li ions are deintercalated from the carbon and then intercalated back into the material with high irreversible capacity and into the Li-free metal oxide.

The separator that may be used in the present invention includes a porous separator and particular examples thereof include polypropylene-based, polyethylene-based, and polyolefin-based porous separators, but is not limited thereto.

The lithium salt may be at least one salt selected from the group consisting of $LiClO_4$, $LiCF_3SO_3$, $LiPF_6$, $LiBF_4$, $LiAsF_6$ and $LiN(CF_3SO_2)_2$.

The electrolyte solvent comprises either or both of: at least one cyclic carbonate selected from the group consisting of ethylene carbonate (EC), propylene carbonate (PC) and gamma-butyrolactone (GBL); and at least one linear carbonate selected from the group consisting of diethyl carbonate (DEC), dimethyl carbonate (DMC), ethyl methyl carbonate (EMC) and methyl propyl carbonate (MPC).

The battery may have an outer shape such as a cylindrical shape using a can, a prismatic shape, a pouch-like shape or a coin-like shape.

BRIEF DESCRIPTION OF THE DRAWINGS

The foregoing and other objects, features and advantages of the present invention will become more apparent from the following detailed description when taken in conjunction with the accompanying drawings in which.

1 is case on the side of cathode, 2 is current collector of cathode, 3 is case on the side of anode, 4 is current collector of anode, 5 is cathode, 6 is anode, 7 is separator, 8 is electrolyte, 9 is packing (or gasket).

BEST MODE FOR CARRYING OUT THE INVENTION

Reference will now be made in detail to the preferred embodiments of the present invention. It is to be understood that the following examples are illustrative only, and the scope of the present invention is not limited thereto.

EXAMPLE 1

As a cathode active material, 77 parts by weight of $Li_2NiO_2$ and 23 parts by weight of $MnO_2$ were used per 100 parts by weight of the cathode active material. Then, 80 wt % of the cathode active material, 10 wt % of KS-6 as a conductive agent and 10 wt % of PVdF as a binder were added to NMP as a solvent to form cathode slurry. The cathode slurry was coated onto an Al collector to provide a cathode.

Figure 1:
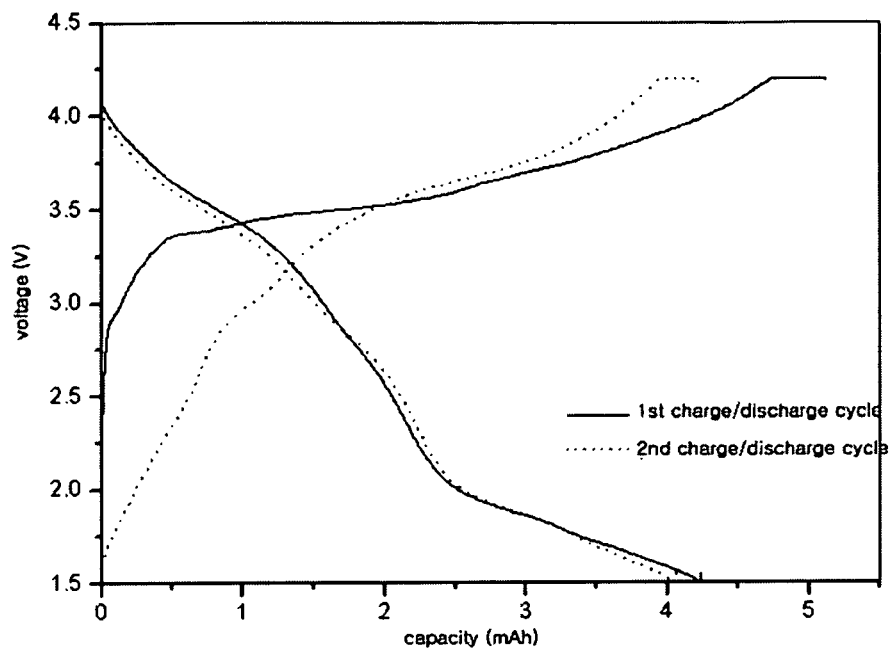
FIG. 1 is a graph showing the charge/discharge profile of the coin-like full cell according to Example 1.

Additionally, artificial graphite was used as an anode active material and 1M $LiPF_6$ dissolved in EC/EMC was used as an electrolyte to provide a coin-like full cell in the conventional manner. The cell was subjected to a charge/discharge test in a voltage range of 1.5V~4.2V, and the discharge profile is shown in FIG. 1.

The charge/discharge mechanism of the above coin-like full cell is as follows: Li ions are deintercalated from $Li_2NiO_2$ and then intercalated into carbon of the anode upon the first charge cycle, while Li ions are deintercalated from the carbon and then intercalated back into the cathode formed of $Li_2NiO_2$ mixed with $MnO_2$ upon the first discharge cycle.

Figure 2:
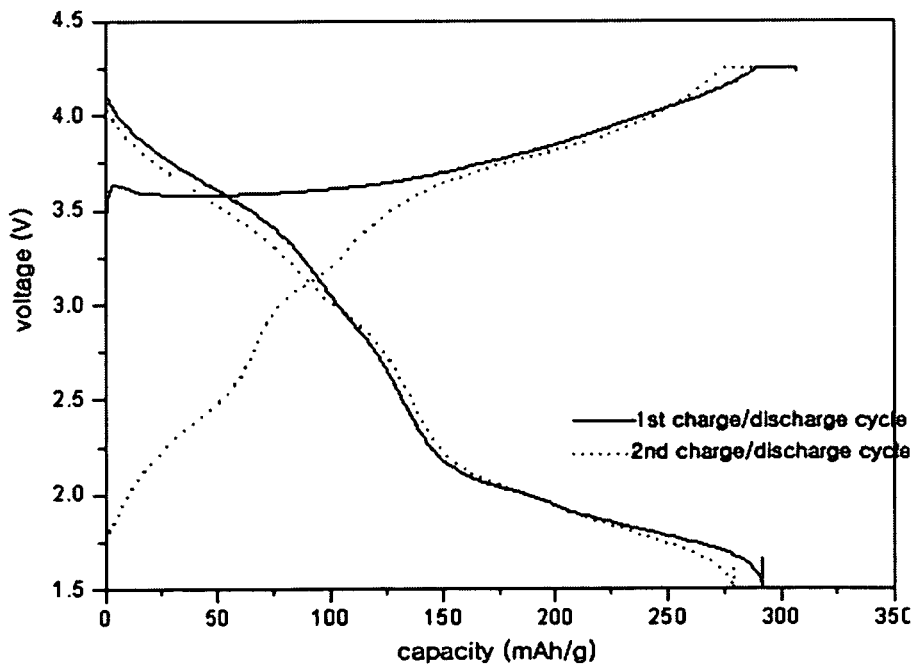
FIG. 2 is a graph showing the charge/discharge profile of the coin-like half cell according to Example 1.

At this time, the cathode comprising the above mixture was determined for its capacity by using a coin-like half cell including the same cathode as described above and Li metal as an anode. Then, the half cell was subjected to a charge/discharge test in a voltage range of 1.5~4.25V, and the charge/discharge capacity is shown in FIG. 2.

EXAMPLE 2

Figure 3:
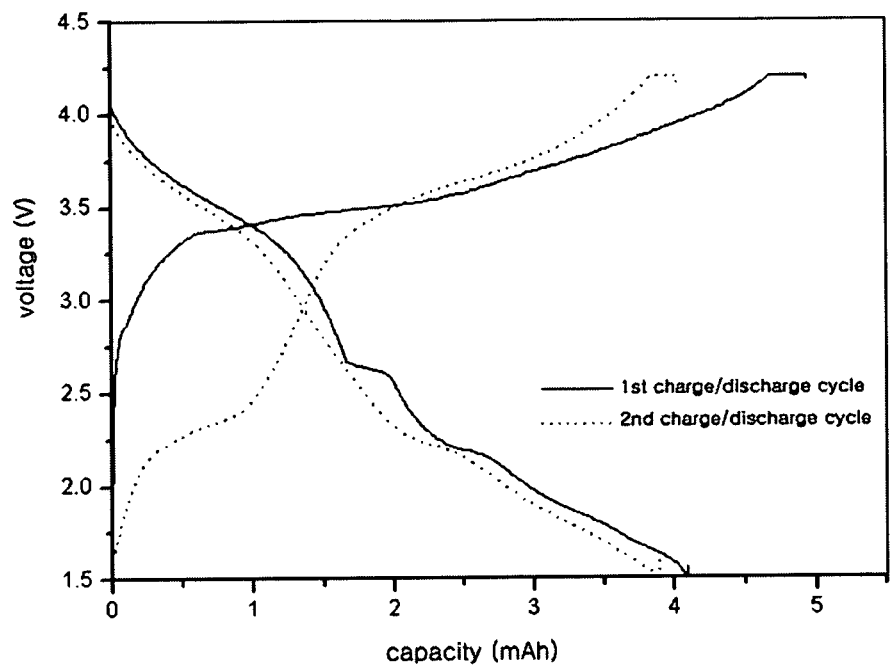
FIG. 3 is a graph showing the charge/discharge profile of the coin-like full cell according to Example 2.

A coin-like full cell was provided in the same manner as described in Example 1, except that $Li_2NiO_2$, mixed with $MoO_3$ in a weight ratio of $Li_2NiO_2$:$MoO_3$=77:23, was used as a cathode active material and carbon was used as an anode active material. Then, the full cell was subjected to a charge/discharge test in a voltage range of 1.5~4.2V. After the test, the charge/discharge profile is shown in FIG. 3.

The charge/discharge mechanism of the above coin-like full cell is as follows: Li ions are deintercalated from $Li_2NiO_2$ and then intercalated into carbon of the anode upon the first charge cycle, while Li ions are deintercalated from the carbon and then intercalated back into the cathode formed of $Li_2NiO_2$ mixed with $MoO_3$ upon the first discharge cycle.

Figure 4:
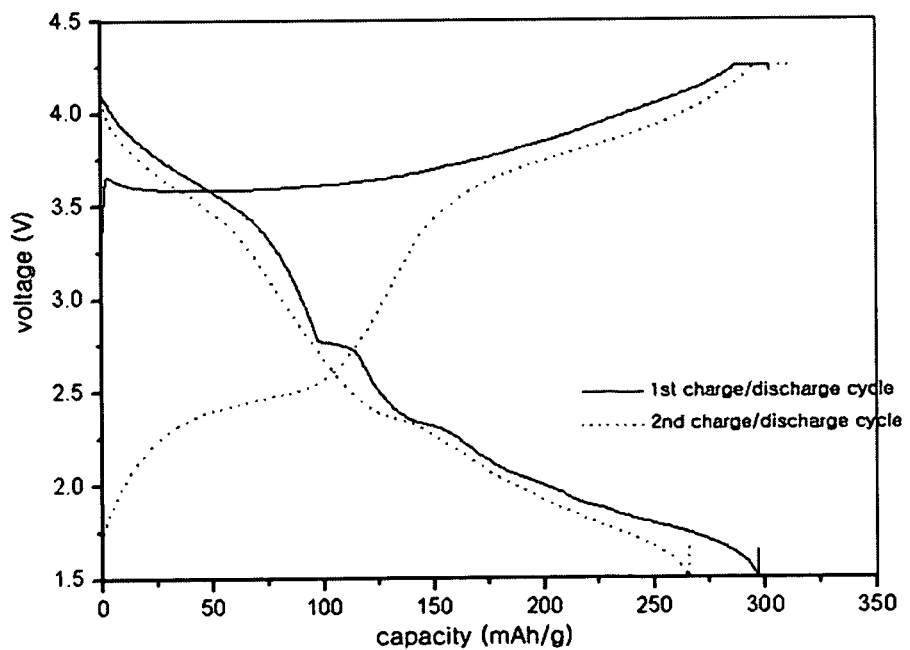
FIG. 4 is a graph showing the charge/discharge profile of the coin-like half cell according to Example 2.

At this time, the cathode comprising the above mixture was determined for its capacity by using a coin-like half cell including the same cathode as described above and Li metal as an anode. Then, the half cell was subjected to a charge/discharge test in a voltage range of 1.5~4.25V, and the charge/discharge capacity is shown in FIG. 4.

COMPARATIVE EXAMPLE 1

As a cathode active material, $LiCoO_2$ was used. Then, 80 wt % of the cathode active material, 10 wt % of KS-6 as a conductive agent and 10 wt % of PVdF as a binder were added to NMP as a solvent to form cathode slurry. The cathode slurry was coated onto an Al collector to provide a cathode. As an anode, Li metal was used. Then, a coil-like half cell was provided from the cathode and the anode, and the half cell was subjected to a charge/discharge test in a voltage range of 1.5~4.25V. The capacity of the half cell is shown in FIG. 5.

Although $LiCoO_2$ has a drive voltage of 3.0~4.25V, the charge/discharge test was performed at a voltage range of 1.5~4.25V in order to compare the cell correctly with the cell according to above Examples 1 and 2. Even if the cell was discharged to 1.5V, the cell did not show a higher capacity than the capacity of the same cell discharged to 3.0V.

Figure 5:
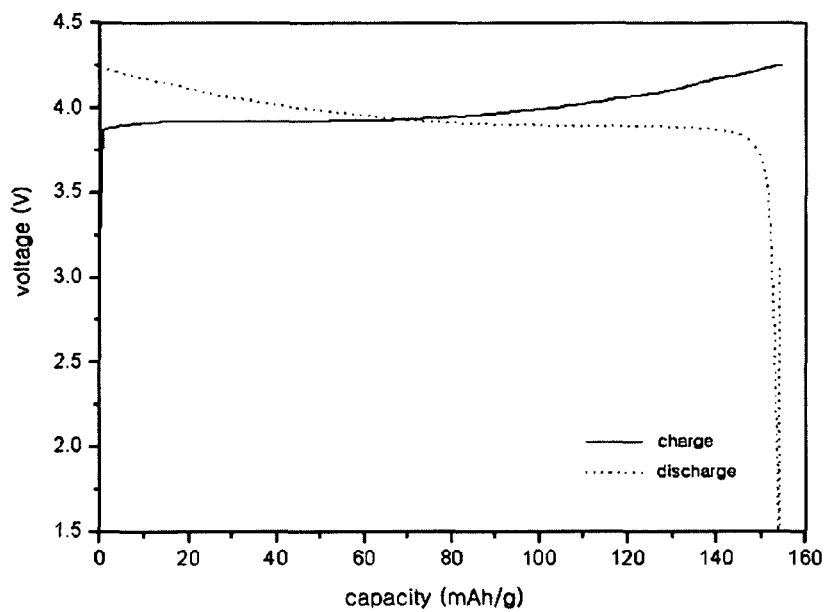
FIG. 5 is a graph showing the charge/discharge profile of the coin-like half cell according to Comparative Example 1.
Figure 6:
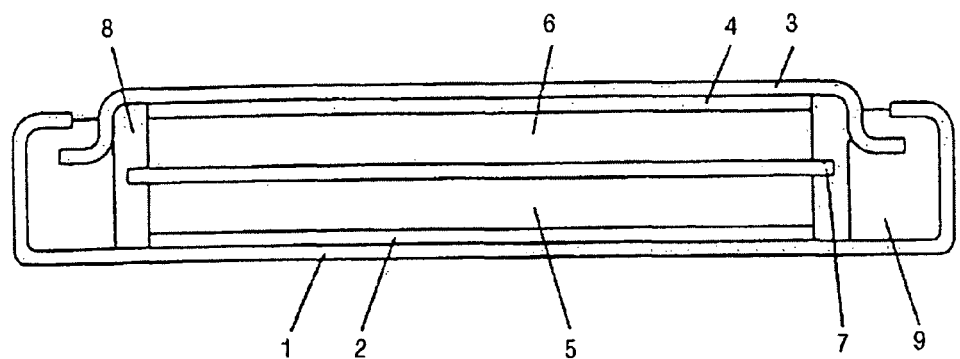
FIG. 6 is a sectional view showing a coin-like cell.

As can be seen from FIG. 5, a currently used cathode active material, i.e., $LiCoO_2$, shows no difference between the capacity of the cell discharged to 3.0V and the capacity of the cell discharged to 1.5V, because the cathode active material cannot contribute to the capacity even if the voltage is dropped to 3.0V or less. However, as shown in FIG. 1 to FIG. 4, the mixed cathode active material according to the present invention shows an increase in the capacity when the cell is discharged to 1.5V. When the cell according to the present invention is discharged to 3.0V, the mixed cathode active material cannot contribute to the capacity to an optimal degree, and thus cannot provide a desired effect of high capacity.

(Result Analysis)

As can be seen from the results of Examples 1 and 2, according to the present invention, it is possible to provide a coil-like full cell by using a cathode comprising $Li_2NiO_2$, which allows deintercalation of a large amount of lithium ions upon the first charge cycle and is a material with high irreversible capacity, in combination with $MnO_2$ or $MoO_3$, which is a Li-free metal oxide, and an anode comprising carbon instead of lithium metal. As shown in FIGS. 2 and 4, the discharge capacity per unit weight of the cathode comprising a mixture of $MnO_2$+$Li_2NiO_2$ (Example 1) and the discharge capacity per unit weight of the cathode comprising a mixture of $MoO_3$+$Li_2NiO_2$ (Example 2) are 292 mAh/g and 296 mAh/g, respectively. Therefore, it can be seen that the full cell according to the present invention shows excellent capacity compared to the cell using a currently used cathode active material such as lithium cobalt oxide, lithium nickel oxide or lithium manganese oxide (FIG. 5).

INDUSTRIAL APPLICABILITY

In general, when a Li-free metal oxide used as a cathode active material, it is necessary to use Li metal as an anode active material in order to provide a Li source. However, as can be seen from the foregoing, the battery according to the present invention comprises a cathode using a mixture of a Li-free metal oxide and a material with high irreversible capacity, and an anode comprising carbon instead of Li metal. The battery according to the present invention shows excellent safety compared to a conventional battery using lithium metal as an anode. Additionally, the present invention provides a novel battery system having a higher charge/discharge capacity compared to a battery using a conventional cathode active material such as lithium cobalt oxide, lithium nickel oxide or lithium manganese oxide.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A cathode active material, which comprises:
   20 to 60 parts by weight of a lithium-free metal oxide, and
   40 to 80 parts by weight of a lithium-containing material with high irreversible capacity, based on 100 parts by weight of the cathode active material,
   wherein the lithium-free metal oxide is at least one compound selected from the group consisting of $MoO_3$, $VO_2$, $Cr_3O_8$, $CrO_2$, $Al_2O_3$, $ZrO_2$, $AlPO_4$, $SiO_2$, and MgO.

2. The cathode active material according to claim 1, wherein the material with high irreversible capacity loses 50% or more of its initially charged capacity by an irreversible phase transition upon a first lithium deintercalation cycle.

3. The cathode active material according to claim 1, wherein the lithium-free metal oxide and the lithium-containing material with high irreversible capacity are mixed with each other.

4. The cathode active material according to claim 1, wherein the material with high irreversible capacity is at least one compound selected from the group consisting of: $Li_{2+x}Ni_{1-y}M_yO_{2+\alpha}$ (wherein $-0.5 \leq x \leq 0.5$; $0 \leq y \leq 1$; $0 \leq \alpha < 0.3$; M is at least one element selected from the group consisting of P, B, C, Al, Sc, Sr, Ti, V, Zr, Mn, Fe, Co, Cu, Zn, Cr, Mg, Nb, Mo and Cd); LiMnO$_2$; LiM$_x$Mn$_{1-x}$O$_2$ (wherein 0.05≤x<0.5, and M is selected from the group consisting of Cr, Al, Ni, Mn and Co); Li$_x$VO$_3$ (wherein 1≤x≤6); Li$_3$Fe$_2$(PO$_4$)$_3$; Li$_3$Fe$_2$(SO$_4$)$_3$; and Li$_3$V(PO$_4$)$_3$.

5. The cathode active material according to claim 1, wherein the material with high irreversible capacity is a compound represented by the following formula 1, and the compound belongs to space group Immm, wherein Ni/M composite oxide forms planar tetracoordinate structures (Ni,M)O$_4$, and one planar tetracoordinate structure shares a side (side formed by O—O) with a nearest neighbor planar tetracoordinate structure, thereby forming a linear chain:

$$Li_{2+x}Ni_{1-y}M_yO_{2+\alpha} \quad \text{[Formula 1]}$$

wherein −0.5≤x≤0.5; 0≤y≤1; 0≤α<0.3; M is at least one element selected from the group consisting of P, B, C, Al, Sc, Sr, Ti, V, Zr, Mn, Fe, Co, Cu, Zn, Cr, Mg, Nb, Mo and Cd.

6. The cathode active material according to claim 1, wherein the lithium-free metal oxide has a charge/discharge capacity ranging from 70 mAh/g to 500 mAh/g.

7. The cathode active material according to claim 1, which shows a charge capacity of the first cycle and a discharge capacity of the first cycle, both being greater than 150 mAh/g.

8. A cathode using the cathode active material comprising:
20 to 60 parts by weight of a lithium-free metal oxide, and
40 to 80 parts by weight of a lithium-containing material with high irreversible capacity, based on 100 parts by weight of the cathode active material,
wherein the lithium-free metal oxide is at least one compound selected from the group consisting of MoO$_3$, VO$_2$, Cr$_3$O$_8$, CrO$_2$, Al$_2$O$_3$, ZrO$_2$, AlPO$_4$, SiO$_2$, and MgO.

9. The cathode according to claim 8, wherein the material with high irreversible capacity loses 50% or more of its initially charged capacity by an irreversible phase transition upon a first lithium deintercalation cycle.

10. The cathode according to claim 8, wherein the material with high irreversible capacity is at least one compound selected from the group consisting of: Li$_{2+x}$Ni$_{1-y}$M$_y$O$_{2+\alpha}$ (wherein −0.5≤x≤0.5; 0≤y≤1; 0≤α<0.3; M is at least one element selected from the group consisting of P, B, C, Al, Sc, Sr, Ti, V, Zr, Mn, Fe, Co, Cu, Zn, Cr, Mg, Nb, Mo and Cd); LiMnO$_2$; LiM$_x$Mn$_{1-x}$O$_2$ (wherein 0.05≤x<0.5, and M is selected from the group consisting of Cr, Al, Ni, Mn and Co); Li$_x$VO$_3$ (wherein 1≤x≤6); Li$_3$Fe$_2$(PO$_4$)$_3$; Li$_3$Fe$_2$(SO$_4$)$_3$; and Li$_3$V(PO$_4$)$_3$.

11. A lithium ion battery, which includes:
a cathode using the cathode active material comprising 20 to 60 parts by weight of a lithium-free metal oxide, and
40 to 80 parts by weight of a lithium-containing material with high irreversible capacity, based on 100 parts by weight of the cathode active material,
wherein the lithium-free metal oxide is at least one compound selected from the group consisting of MoO$_3$, VO$_2$, Cr$_3$O$_8$, CrO$_2$, Al$_2$O$_3$, ZrO$_2$, AlPO$_4$, SiO$_2$, and MgO.

12. The lithium ion battery according to claim 11, which uses an anode active material comprising a material that contains no lithium and is capable of lithium ion intercalation/deintercalation.

13. The lithium ion battery according to claim 12, which uses carbon as the anode active material.

14. The lithium ion battery according to claim 11, wherein the material with high irreversible capacity is at least one compound selected from the group consisting of: Li$_{2+x}$Ni$_{1-y}$M$_y$O$_{2+\alpha}$ (wherein −0.5≤x≤0.5; 0≤y≤1; 0≤α<0.3; M is at least one element selected from the group consisting of P, B, C, Al, Sc, Sr, Ti, V, Zr, Mn, Fe, Co, Cu, Zn, Cr, Mg, Nb, Mo and Cd); LiMnO$_2$; LiM$_x$Mn$_{1-x}$O$_2$ (wherein 0.05≤x<0.5, and M is selected from the group consisting of Cr, Al, Ni, Mn and Co); Li$_x$VO$_3$ (wherein 1≤x≤6); Li$_3$Fe$_2$(PO$_4$)$_3$; Li$_3$Fe$_2$(PO$_4$)$_3$; and Li$_3$V(PO$_4$)$_3$.

* * * * *